United States Patent
Fields et al.

(10) Patent No.: US 8,996,070 B2
(45) Date of Patent: Mar. 31, 2015

(54) METHOD AND APPARATUS PERTAINING TO TELEPHONE NUMBER DISPLAY FORMATTING

(75) Inventors: Gregory Jason Fields, Waterloo (CA); Jeffrey Alan Kuckelman, Pocatello, ID (US)

(73) Assignee: BlackBerry Limited, Waterloo (CA)

( * ) Notice: Subject to any disclaimer, the term of this patent is extended or adjusted under 35 U.S.C. 154(b) by 372 days.

(21) Appl. No.: 13/405,848

(22) Filed: Feb. 27, 2012

(65) Prior Publication Data

US 2013/0225138 A1 Aug. 29, 2013

(51) Int. Cl.
- *H04M 1/00* (2006.01)
- *H04B 1/38* (2006.01)
- *H04M 1/56* (2006.01)
- *H04M 1/57* (2006.01)

(52) U.S. Cl.
CPC . *H04M 1/57* (2013.01); *H04M 1/56* (2013.01)
USPC ........................................................ 455/566

(58) Field of Classification Search
CPC ... H04W 16/16; H04W 84/16; H04W 84/045; H04W 60/00
USPC ........................................................ 455/566
See application file for complete search history.

(56) References Cited

U.S. PATENT DOCUMENTS

| | | | |
|---|---|---|---|
| 5,995,843 A * | 11/1999 | Sjodin et al. | 455/462 |
| 6,363,258 B1 | 3/2002 | Schmidt et al. | |
| 2004/0192378 A1* | 9/2004 | Wulkan | 455/555 |
| 2006/0002536 A1 | 1/2006 | Ambrose | |
| 2007/0117555 A1* | 5/2007 | Gewecke | 455/415 |

OTHER PUBLICATIONS

Extended European Search Report from related European Patent Application No. 13157043.4 dated Jun. 10, 2013; 5 pages.
Article 94(3) EPC from related European Patent Application No. 13157043.4 dated May 8, 2014; 4 pages.
Canadian Office Action from related Canadian Patent Application No. 2,807,788 dated Aug. 27, 2014; 2 pages.

* cited by examiner

*Primary Examiner* — Marisol Figueroa
(74) *Attorney, Agent, or Firm* — Fitch, Even, Tabin & Flannery LLP

(57) ABSTRACT

A control circuit automatically presents on a display public telephony system telephone numbers using a presentation format that is standard for the public telephony system and private-exchange telephone numbers using a presentation format that includes a non-numeric private exchange modality indicator. By one approach, the non-numeric private exchange modality indicator consists of a single alphabetic character (such as, for example, the alphabetic character "X") which may, if desired, by presented contiguously with the remainder of the private-exchange telephone number.

12 Claims, 2 Drawing Sheets

METHOD AND APPARATUS PERTAINING TO TELEPHONE NUMBER DISPLAY FORMATTING

FIELD OF TECHNOLOGY

The present disclosure relates to communication devices and more particularly to the display of telephone numbers.

BACKGROUND

Many communication devices, including portable communication devices, support telephony. Typically, a calling party initiates a call by inputting or otherwise utilizing a telephone number that is specific to the called party (such as a home telephone number, a mobile telephone number, an office telephone number, and so forth) though some telephone numbers serve as a portal to a suite of contact addresses for a given party. In some cases the telephone number for a calling party is provided to the called party to permit the called party to identify the calling party prior to accepting an incoming call.

Telephone numbers typically observe a particular regionally-specific format or syntax. Many times this format reflects the particular format selected by a corresponding public telephony system. As one simple example in this regard, in the United States public telephony system telephone numbers are typically ten digits in length, with three of the digits representing an area code.

Moreover, such public telephony system telephone numbers are typically presented pursuant to a corresponding presentation format. For example, the aforementioned 10-digit U.S. public telephony system telephone numbers are typically presented with the 3-digit area code segregated in some fashion from the remaining seven digits (sometimes with a mere space but often, in addition, by containing the three digits of the area code within parenthesis). In addition, the remaining seven digits are often split between a 3-digit prefix and the remaining four digits by use of a hyphen. Accordingly, a typical U.S. public telephony system telephone number is often presented using the format "(555) 123-4567." Similar spacing and/or hyphenation approaches are used when presenting public telephony system telephone numbers in other regions (albeit as appropriately modified to suit local conventions.

Private-exchange telephone numbers are also known. Many enterprises utilize, for example, a so-called PBX (or other enabling platform, such as but not limited to Research in Motion's™ Mobile Voice System™) to privately support and effect telephony both within and without the organization. In many cases, these private-exchange telephone numbers are simply a shortened version of a corresponding public telephony system telephone number. For example, if the public telephony system telephone number for a given office is (555) 123-4567, then a typical corresponding private-exchange telephone number might be the 4-digit number "4567" or the 5-digit number "34567." Using this approach, for example, a person calling from within such an enterprise to another party within the enterprise can initiate the call by merely dialing the private-exchange telephone number for that called party rather than the complete public telephony system telephone number for that party.

Though such approaches are well established and satisfactory for many application settings, there nevertheless exists considerable room for improvement.

DETAILED DESCRIPTION

Figure 1:
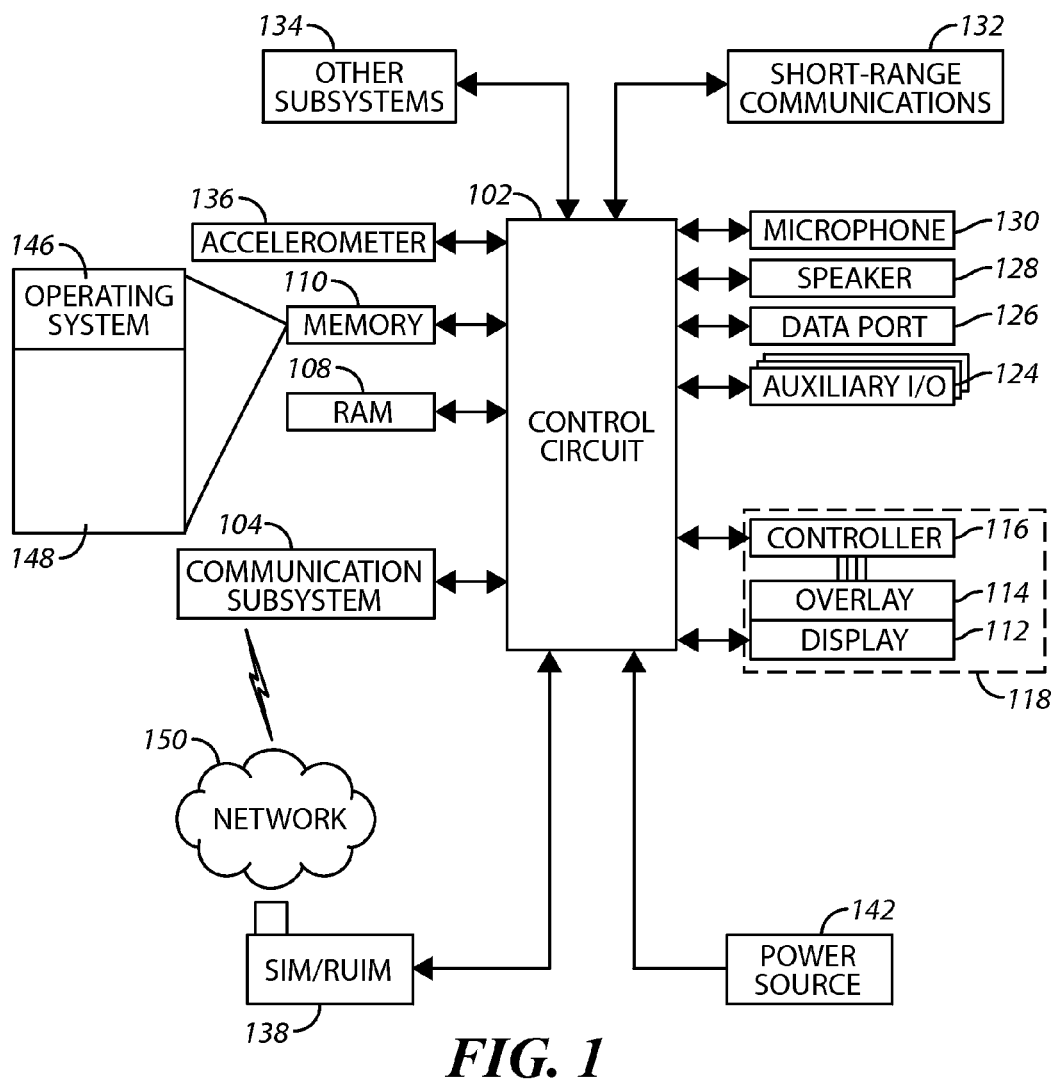
FIG. 1 is a block diagram in accordance with the disclosure.

The following describes an apparatus and method pertaining to a control circuit that automatically presents on a display public telephony system telephone numbers using a presentation format that is standard for the public telephony system and private-exchange telephone numbers using a presentation format that includes a non-numeric private exchange modality indicator.

By one approach, the non-numeric private exchange modality indicator consists of a single alphabetic character (such as, for example, the alphabetic character "X") which may, if desired, by presented contiguously with the remainder of the private-exchange telephone number.

The control circuit can, by one approach, use the private-exchange telephone number presentation format when and as the user inputs (or selects) a private-exchange telephone number to facilitate initiating a call. By another approach, in lieu of the foregoing or in combination therewith, the control circuit employs this private-exchange telephone number presentation format when presenting caller-identification information as corresponds to an incoming call.

By one approach the control circuit is configured to determine when to employ the public telephony system telephone number presentation format and when to employ the private-exchange telephone number presentation format. Such a determination, by one approach, can be based in some cases, at least in part, upon detecting when the control circuit is attached to a private exchange.

These teachings are highly flexible in practice and will accommodate a wide variety of variations with respect to implementation. These teachings are also highly scalable and can be successfully employed with essentially any number of presentation formats (both public and private). In fact, to a considerable extent, the utility and benefit of these teachings increases as the number of possibilities in these regards increases.

So configured, these teachings provide a highly intuitive and simple approach to providing a user with the right information at the right time. Generally speaking, a user can benefit from the described approaches with little or no training as the described activities can be carried out in a highly transparent manner and without requiring any particular special instructions or user-initiated learning mode.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Referring to FIG. 1, an exemplary portable electronic device (such as, but not limited to, a cellular telephone) includes a control circuit 102 (such as a properly programmed processor) that controls the overall operation of the portable electronic device. Communication functions, including data and voice communications, are performed through a communication subsystem 104. The communication subsystem receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device.

The control circuit 102 interacts with other elements, such as a Random Access Memory (RAM) 108, a memory 110, a display 112 with a touch-sensitive overlay 114 operably coupled to an electronic controller 116 that together comprise an optional touch-sensitive display 118 (sometimes referred to herein as a touch-screen display), an auxiliary input/output (I/O) subsystem 124 (which might comprise, for example, a physical keyboard such as a full QWERTY keyboard), a data port 126, a speaker 128, a microphone 130, a short-range communication subsystem 132 (such as, for example, a Bluetooth-based short-range communication subsystem), and other device subsystems 134 of choice.

One or more user interfaces are provided. Input via a graphical user interface is provided via the touch-sensitive overlay 114. The control circuit 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the control circuit 102.

The control circuit 102 may interact with an accelerometer 136 that may be utilized to detect direction of gravitational forces or gravity-induced reaction forces.

To identify a subscriber for network access, the portable electronic device may utilize a Subscriber Identity Module or a Removable User Identity Module (SIM/RUIM) card 138 for communication with a network, such as the wireless network 150. Alternatively, user identification information may be programmed into the memory 110.

The portable electronic device includes an operating system 146 and software programs, applications, or components 148 that are executed by the control circuit 102 and are typically stored in a persistent, updatable store such as the memory 110. Additional applications or programs may be loaded onto the portable electronic device through the wireless network 150, the auxiliary I/O subsystem 124, the data port 126, the short-range communications subsystem 132, or any other suitable subsystem 134. The memory 110 may comprise a non-transitory storage media that stores executable code that, when executed, causes the control circuit 102 to carry out one or more of the functions or actions described herein.

A received signal such as a text message, an e-mail message, or web page download is processed by the communication subsystem and input to the control circuit 102. The control circuit 102 processes the received signal for output to the display 112 and/or to the auxiliary I/O subsystem 124. A subscriber may generate data items, for example e-mail messages, that may be transmitted over the wireless network 150 through the communication subsystem. For voice communications, the overall operation of the portable electronic device is similar. The speaker 128 outputs audible information converted from electrical signals and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. One or more touches, also known as touch contacts, touch events, or sometimes gestures may be detected by the touch-sensitive display 118. The control circuit 102 may determine attributes of the touch, including a location, direction, and/or extent of a touch. Touch location data may include data for an area of contact or data for a single point of contact, such as a point at or near a center of the area of contact.

Figure 2:
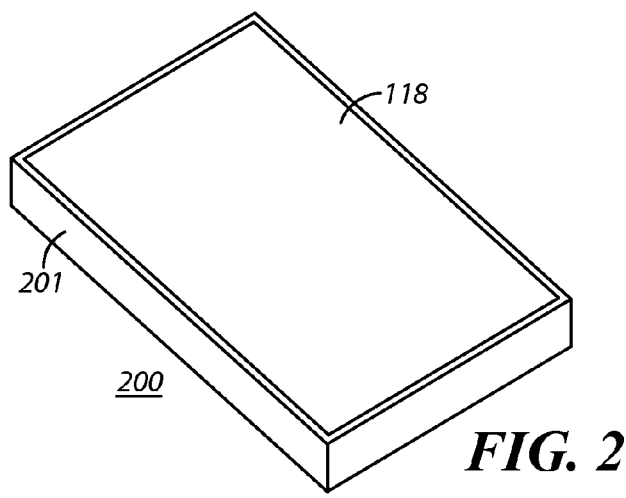
FIG. 2 is a perspective view in accordance with the disclosure.

Referring to FIG. 2, for the sake of illustration but without intending any limitations in these regards, the following description will presume that the portable electronic device comprises a portable two-way wireless communications device 200 such as a so-called smartphone. Such a device 200 often comprises a housing 201 to contain the foregoing components including the touch-screen display 118.

Figure 3:
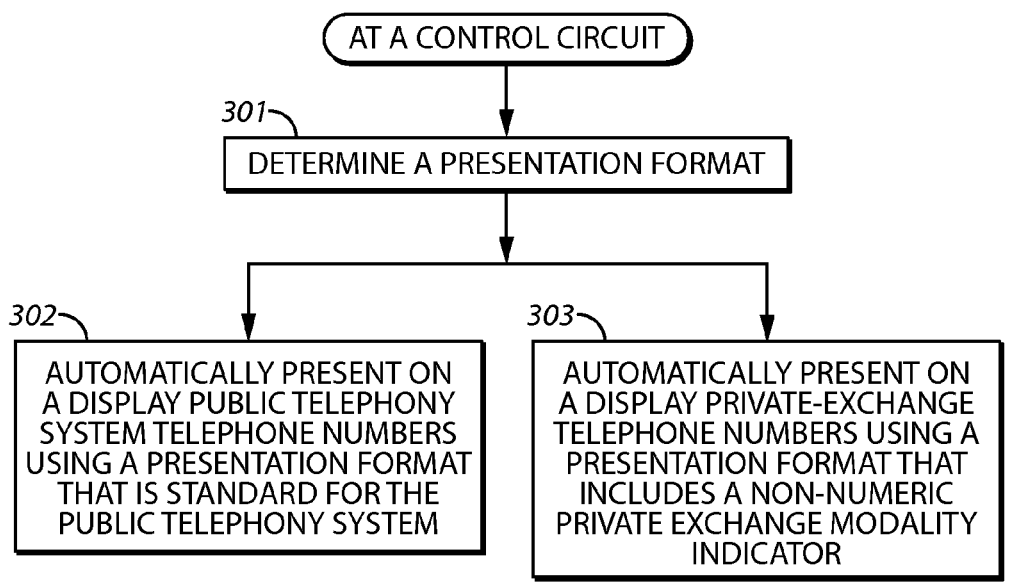
FIG. 3 is a flow diagram view in accordance with the disclosure.

Referring to FIG. 3, the control circuit 102 can be configured (for example, via appropriate programming) to determine 301 a particular presentation format to use when presenting digits via the aforementioned display 112. The need to make this determination 301 can arise, for example, because the user of the device is entering digits in order to initiate a call. As another example in these regards, the need to make this determination 301 may arise because the control circuit 102 receives caller-identification information as part of in-coming call signaling, which caller-identification information includes digits that correspond to the caller.

By one approach, the control circuit 102 may determine 301 to use 302 a local public telephony system telephone number presentation format as a default option. In such a case, the control circuit 102 may determine 301 to switch to using 303 a private-exchange telephone number presentation format in response to detecting the attachment of the device to a private exchange.

There are various ways by which the control circuit 102 may detect such attachment. By one approach, for example, the device may attach to the private exchange using a different wireless modality (such as WiFi or other short or medium-range wireless protocol) and/or by using an attachment signaling protocol that provides a firm basis for determining the attachment state. Generally speaking, the present teachings are not overly sensitive to any particular approaches or practices in these regards and therefore further elaboration in these regards is not presented here.

Figure 4:
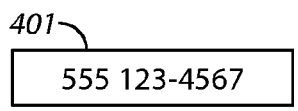
FIG. 4 is a screen shot in accordance with the disclosure.

FIG. 4 provides one illustrative example of a telephone number that is automatically presented 302 using a public telephony system presentation format 401. The specifics of the presentation format can and will change with the specific public telephony system.

Figure 5:
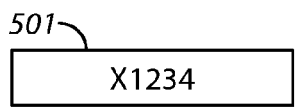
FIG. 5 is a screen shot in accordance with the disclosure.
Figure 6:
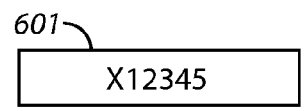
FIG. 6 is a screen shot in accordance with the disclosure.

FIGS. 5 and 6 provide illustrative examples of a telephone number that is automatically presented 303 using a private-exchange telephony system presentation format 501 and 601, respectively. In the format 501 illustrated in FIG. 5 the private-exchange telephony system format consists of a 4-digit number while the private-exchange telephony system format 601 illustrated in FIG. 601 consists of a 5-digit number. In both cases, the presentation format includes a single alphabetic character (in this case, the alphabetic character "X") as a contiguous prefix to the numerical digits that comprise the private-exchange telephone number itself. (Four and five digits numbers are commonly used in these regards, and therefore the private exchange telephone numbers can be viewed as each typically consisting of N numerals, where N is an integer selected from the group 4 and 5.)

This alphabetic character serves as a non-numeric private exchange modality indicator. Accordingly, the use of this alphabetic character comprises a simple, readily-observed, and intuitive signal to the observer that the presented telephone number corresponds to a private exchange rather than to a public telephony system. This, in turn, can provide useful information to the user regarding, for example, the attached state of their calling device and/or the enterprise-based location (specifically or generally) of the calling device. This information can assist the user with making informed decision regarding answering calls, for example.

These teachings are readily deployed in conjunction with existing practices and methodologies and hence can serve to significantly leverage those existing practices and methodologies to further their continued utility and viability. The disclosed practices can also be economically deployed.

The present disclosure may be embodied in other specific forms without departing from its essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. An apparatus comprising:
a wireless transceiver;
a display;
a control circuit operably coupled to the wireless transceiver and the display and configured to:
automatically present on the display public telephony system telephone numbers using a presentation format that is standard for the public telephony system;
automatically detect attachment to a private exchange;
in response to detecting the attachment to the private exchange, and when a user inputs numbers to initiate a call, automatically switching from using the presentation format that is standard for the public telephony system and instead present on the display private-exchange telephone numbers using a presentation format that includes a non-numeric private exchange modality indicator.

2. The apparatus of claim 1 wherein the non-numeric private exchange modality indicator consists of a single alphabetic character.

3. The apparatus of claim 2 wherein the single alphabetic character is displayed contiguous with the private-exchange telephone number.

4. The apparatus of claim 3 wherein the single alphabetic character comprises the alphabetic character X.

5. The apparatus of claim 1 wherein the private exchange telephone numbers each consists of N numerals, where N is an integer selected from the group 4 and 5.

6. The apparatus of claim 1 wherein the control circuit is configured to automatically present on the display private-exchange telephone numbers using a presentation format that includes a non-numeric private exchange modality indicator when presenting caller-identification information as corresponds to an incoming call.

7. A method comprising:
at a control circuit:
automatically presenting on a display public telephony system telephone numbers using a presentation format that is standard for the public telephony system;
automatically detect attachment to a private exchange;
in response to detecting the attachment to the private exchange, and when a user inputs numbers to initiate a call, automatically switching from using the presentation format that is standard for the public telephony system and instead presenting on the display private-exchange telephone numbers using a presentation format that includes a non-numeric private exchange modality indicator.

8. The method of claim 7 wherein the non-numeric private exchange modality indicator consists of a single alphabetic character.

9. The method of claim 8 wherein the single alphabetic character is displayed contiguous with the private-exchange telephone number.

10. The method of claim 7 wherein automatically presenting on the display private-exchange telephone numbers using a presentation format that includes a non-numeric private exchange modality indicator occurs when presenting caller-identification information as corresponds to an incoming call.

11. A non-transitory digital memory having computer instructions stored therein, which computer instructions, when executed by a processor, cause the processor to:
automatically present on a display public telephony system telephone numbers using a presentation format that is standard for the public telephony system;
automatically detect attachment to a private exchange;
in response to detecting the attachment to the private exchange, and when a user inputs numbers to initiate a call, automatically switching from using the presentation format that is standard for the public telephony system and instead present on the display private-exchange telephone numbers using a presentation format that includes a non-numeric private exchange modality indicator.

12. The non-transitory digital memory of claim 11 wherein the non-numeric private exchange modality indicator consists of a single alphabetic character.

* * * * *